United States Patent [19]

Pinney

[11] 3,717,330
[45] Feb. 20, 1973

[54] HIGH VISCOSITY FINISHER

[75] Inventor: Baden McDowall Pinney, Kingston, Ontario, Canada

[73] Assignee: Du Pont of Canada, Limited, Montreal, Canada

[22] Filed: June 3, 1971

[21] Appl. No.: 149,580

[30] Foreign Application Priority Data

June 8, 1970 Canada..................................084,936

[52] U.S. Cl....................................................259/6
[51] Int. Cl................................................B01f 7/16
[58] Field of Search.....259/6, 104, DIG. 30; 15/93 R

[56] References Cited

UNITED STATES PATENTS

| 617,735 | 1/1899 | Godfrey | 259/6 X |
| 3,226,097 | 12/1965 | Vayda et al. | 259/6 X |
| 3,343,922 | 9/1967 | Zimmer et al. | 259/6 X |

*Primary Examiner*—Robert W. Jenkins
*Assistant Examiner*—Philip R. Coe
*Attorney*—Herbert W. Larson

[57] ABSTRACT

A self-wiping multiple screw element mixer of conical configuration useful as a polymerizer/finisher for the preparation of high viscosity polymers such as polyamides, polyesters, etc.

6 Claims, 5 Drawing Figures

INVENTOR
BADEN M. PINNEY

INVENTOR
BADEN M. PINNEY

HIGH VISCOSITY FINISHER

SUMMARY OF THE INVENTION

This invention relates broadly to a mixing apparatus and more particularly a self-wiping multiple screw element mixer of conical configuration useful as a separator/finisher for producing polymers such as polyamides, polyesters, etc.

The term "mixing" used herein includes finishing high viscosity synthetic polymers, mixing two or more viscous liquids and blending solids and liquids together.

BACKGROUND OF THE INVENTION

In the preparation of synthetic polyamides or polyesters, bifunctional amide-forming or ester-forming monomers are continuously heated, often under conditions of reduced pressure, to promote the condensation reaction and to assist in the removal of volatile by-products until the desired degree of polymerization is attained, as indicated, for example, by viscosity measurement or molecular weight.

The term "reduced pressure" used herein refers to the condition that promotes the vaporization of reaction by-products. This condition may be obtained by creating a partial vacuum or by the use of an inert atmosphere.

Polyamides and polyesters may be prepared by either a batch process or a continuous process. Various of either methods for preparing these polymers are known in the art. For example, in the case of a polyamide a concentrated aqueous solution of the amide-forming reactants, such as a salt of a diamine and a dicarboxylic acid, can be supplied to a reactor wherein the temperature and pressure conditions are such that a major portion of the salt is converted to polymer. In one type of continuous polymerization process, the reaction mass is then fed to a flasher vessel where heat is added to maintain the temperature, but the pressure conditions are reduced thus permitting the separation of water from the reaction mass as steam. Finally, the polymer is fed to a separator/finisher, hereinafter referred to as a finisher, wherein the desired degree of polymerization is obtained.

In a typical case for preparing a polyester, an ester-forming monomer, such as bis(hydroxyalkyl) terephthalate, which has been prepared by the ester interchange of a lower dialkyl ester with alkylene glycol, is subjected to certain conditions of pressure and temperature, in the presence of a catalyst, to promote polymerization. Provision is made to remove the volatile by-products, such as methanol, and any excess alkylene glycol that may be present. In a continuous polymerization process, the reaction mass is normally passed through at least two vessels before the desired degree of polymerization is obtained. Each vessel usually has a higher temperature and a lower pressure than the vessel preceding it. The final vessel is often referred to as a finisher and the polymer leaving the finisher is in a condition where it can be usefully extruded into a film or spun into filaments.

The partial pressure of the volatile by-products is reduced during the finishing step either by the use of an inert atmosphere or by finishing under a partial vacuum. However, there is usually a long retention time required in the finisher for the polymer to reach the predetermined molecular weight. This long retention time often leads to deposits of by-products such as degraded polymer on unwiped surfaces in the finisher. In the case of polyamides, these degraded polymers are sometimes referred to as "gel".

In conventional finishers of the intermeshing screw design, used in the preparation of polyamides, the gel problem is overcome as the screws are self-wiping. However, most of these conventional finishers do not provide a long retention time for the polymer, hence they must be redesigned to have a greater volumetric capacity, and this redesign can result in an impractical or expensive finisher. Furthermore, where the polymer entering the finisher has a high moisture content, foaming or flooding of the venting section of the screw may occur because of the limited vapor disengagement space provided in conventional screw finishers. For large diameter, fully wiped, deep channel screw finishers, the screw volume to free volume ratio is high thus limiting the maximum use of the vessel space. Another disadvantage of this type of fully wiped deep channel screw finisher may arise due to poor heat dissipation. This is caused by high viscous shear occurring opposite limited cooling capacity.

In conventional finishers comprising large vessels, often conical in shape, having ribbon type or paddle type agitators, the problem of having very long screws is overcome, as well as the problem of foaming or flooding the venting section, as a large vessel can have ample vapor disengagement space. However, as the agitators are not self-wiping, gel deposits build up on the unwiped surfaces, and the vessel has to be cleaned out at regular intervals.

DETAILED DESCRIPTION OF THE INVENTION

It is therefore an object of the present invention to provide a mixing apparatus having self-wiping features.

It is a further object to provide a mixing apparatus for preparing polymers which eliminates the disadvantages of the conventional finishers while retaining and combining the main disadvantages of all types.

An additional object of the present invention is to provide a mixing apparatus having a mixing zone and a pumping zone.

With these and other objects in view, there is provided an apparatus suitable for mixing comprising: a vessel having an interior surface throughout its length in the shape of at least two intersecting conical frustums with axes parallel and substantially vertical, the base of the frustums being displaced upwards with respect to the apexes, at least two interengaging helical screw elements rotatably mounted within the vessel which when co-rotated conform to the interior surface of the vessel such that the screw elements effect a complete cleaning of the interior surface and wherein the screw elements interengage uninterruptedly along their length such that each element effects a complete cleaning of the adjacent elements.

THE DRAWINGS

In the drawings which illustrate embodiments of the invention:

Figure 1:
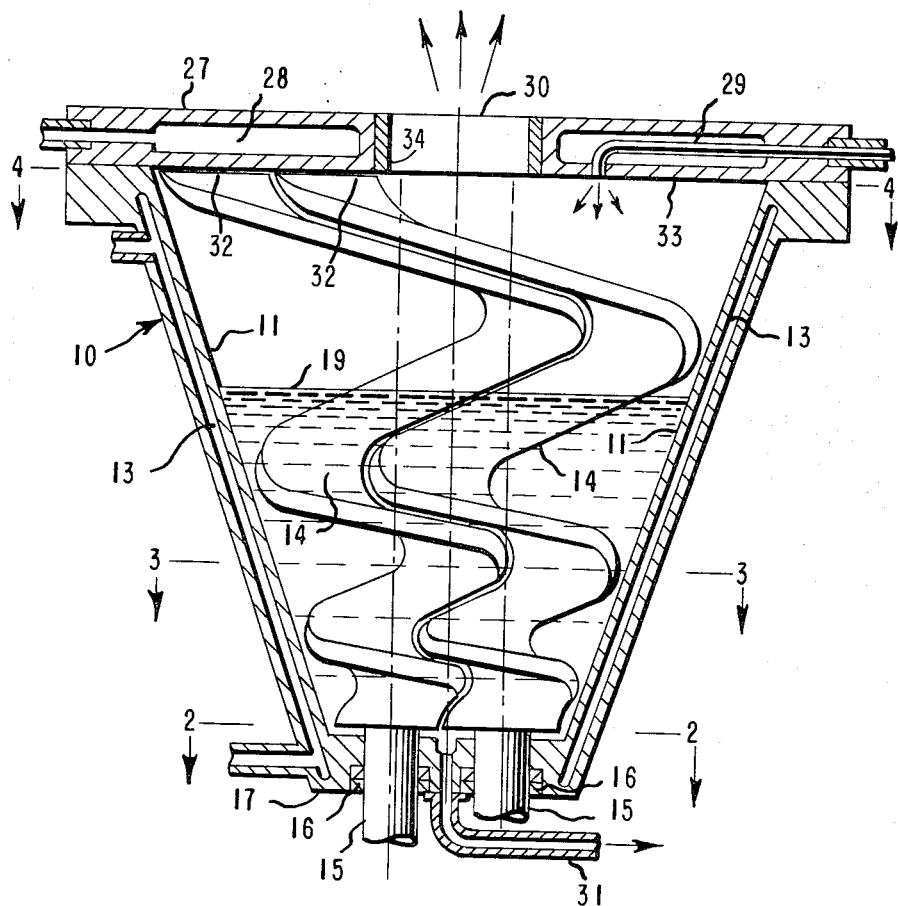
FIG. 1 is a vertical sectional view of one embodiment of a mixing apparatus of this invention.
Figure 2:
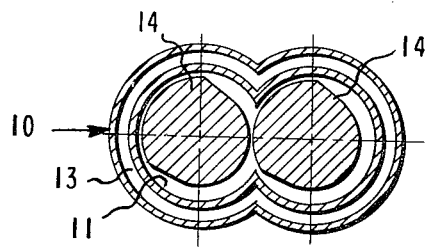
FIG. 2 shows a cross-sectional view of the interengaging screw elements at 2—2 in FIG. 1.
Figure 3:
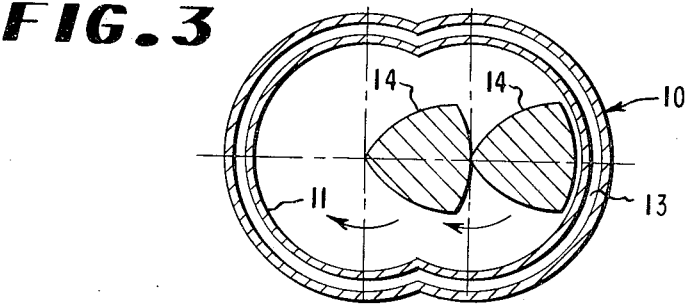
FIG. 3 shows a cross sectional view of the interengaging screw elements at 3—3 in FIG. 1.

The mixing apparatus illustrated in FIG. 1 includes a vessel 10 having interior surface 11 which takes the shape of two intersecting frustums of cones with parallel axes. The axes are generally substantially vertical and the base of each of the cones is displaced upwards with respect to the cone apexes. Under some conditions it may be desirable to have the axes of the vessel tilted from the vertical. Surrounding the interior surface 11 is a heating jacket 13. The heating jacket 13 shown is for a vapor or liquid heating medium such as "Dowtherm" registered trademark of Dow Chemical. Under some conditions the jacket 13 may cool the vessel to stop the temperature rising above a preset level. Alternatively, an electrical heating jacket may be substituted, the vessel wall 11 may be finned externally for heating or cooling by air, or in certain cases neither jacketing nor finning is required.

Inside the vessel are two co-rotating, interengaging screw elements 14 connected to shafts 15 which pass through seals 16 in the base 17 of the vessel. The screw elements 14 are self-wiping for their full length. The screw elements 14 also wipe the entire interior surface 11 of the vessel, including the top and bottom plate of the conical frustums. The geometrics of the screw elements from the bottom of the screws, i.e., at section 2—2 up to section 3—3, is such that pressure generating characteristics are obtained. These pressure generating characteristics need only occur from the bottom of the screws up to approximately halfway between section 2—2 and section 3—3. The geometric development of these portions of the twin screws incorporating self-wiping features is well known in the art, although in the past it has been more frequent to employ these features in parallel rather than tapered screws. There are many types of intermeshing screw configurations, some having a single start, some having multiple starts, which are all suitable for this application. This section of the vessel between section 2—2 and section 3—3 is hereinafter referred to as the pressure generating zone.

Figure 4:
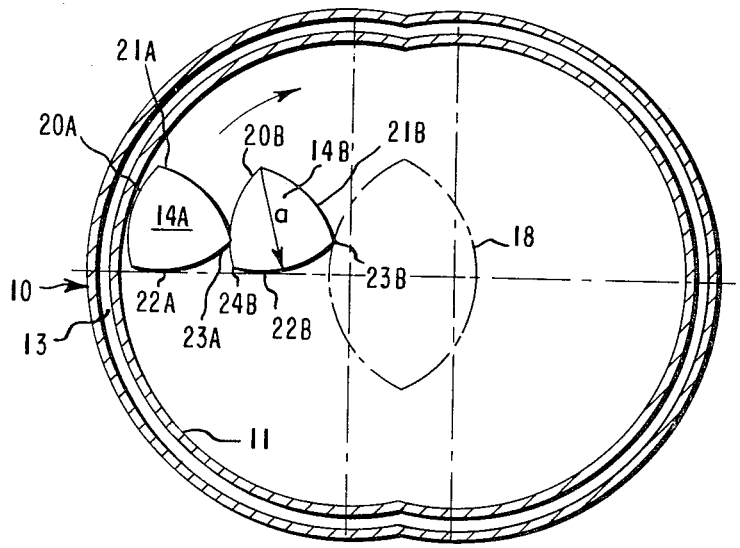
FIG. 4 shows a cross-sectional view of the interengaging screw elements at 4—4 in FIG. 1.
Figure 5:
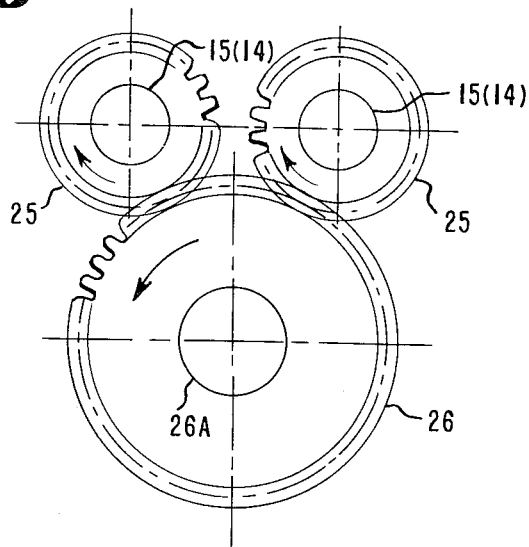
FIG. 5 shows an end view of one embodiment of a drive mechanism for the interengaging screw elements of the present invention.

At section 3—3 the core radii are equal to their center to center distance and this marks an important transition in the character of the screw elements. In the pressure generating zone below section 3—3 many types of self-wiping twin screw configurations are possible (as indicated in the previous paragraph), but above section 3—3, there are only a limited number of self-wiping screw configurations. One such configuration is shown in FIG. 4.

Above section 3—3 the conical vessel increases in diameter, but the cross-sectional area of the screw elements remains constant. The vessel screw relationship begins to change in character in that a hollow center 18 shown in FIG. 4 starts to appear by virtue of the increasing diameter of the conical shape of the vessel. This so-called hollow center 18 is not traversed by any part of the screw elements. The maximum size of hollow center 18 occurs at the top of the screw elements.

This portion of the vessel above section 3—3 to the top of the screw elements is referred to as a mixing zone. In the case of a finisher, mixing and circulation of the polymer occurs in the melt pool at the lower part of this zone, and thin film generation and vapor diffusion occurs at the upper part of the zone. As shown in FIG. 1, the liquid level 19 divides the mixing zone into an upper part and a lower part. The level 19 may be raised if more mixing and circulation is required or lowered if it is desirable to have the greater part of the vessel acting as a thin film generator and vapor disengagement section.

The screw elements may be cast integrally with the shafts 15 in stainless steel or other suitable material or may be separate components. A helix angle is selected from a wide range to provide good wiping of screws and wall. Other considerations in selecting the helix angle include sufficient surface area generation for mass transfer purposes and adequate mechanical strength in the screws.

In one embodiment, a part of the screw length has a 90° helix angle (infinite pitch). This produces blades having straight elements which are easily manufactured and retain the self-wiping features.

In the embodiment illustrated, FIG. 4 shows the cross section of two screw elements 14A and 14B of equal size. The cross section of each element is shown bounded by three equal arcs. Arcs 20A and 20B face the interior surface 11 of the vessel, and the remaining arcs 21A, 21B, 22A and 22B join at land edges 23A and 23B pointing towards the center of the vessel. All the arcs have a radius $a$ which has its center point at the land edge opposite each arc. This radius is approximately equal to the center distance between the two cones. The cross section of the elements remains constant from section 3—3 to section 4—4.

As may be seen in FIG. 4, upon rotation of the two screw elements 14A and 14B in the same direction, one land edge 23A on the screw element 14A wipes the outer arc 20B of the screw element 14B. The elements rotate in the direction indicated by the arrow, and the land edge 23A moves across the arc 20B in a direction opposite to the rotation of the elements until land edge 23A reaches land edge 24B on element 14B. At this time the relative position of the two elements changes, and the land edge 24B commences to wipe the arc 21A of the element 14A. In one complete revolution of the screw elements 14A and 14B, the three arcs on both elements are wiped together with the interior surface 11 of the vessel.

One type of drive for the two screw elements 14 is shown in FIG. 7. Two gear wheels 25 having the same number of teeth are joined to shafts 5 and a drive gear 26 drives both gear wheels 25 in the same direction, at the same speed and without any slippage occurring. The drive gear 26 is connected to a shaft 26A which in turn is driven at a constant speed by a motor through a standard gear reduction. It has been found that in certain cases with careful selection of the helix angle of the screw elements the gear wheels may be omitted and if one screw element is driven the second screw element is rotated through its engagement with the driven screw. The speed of rotation of the screw elements 14 is selected on the basis of adequate shear rates in the operating clearances to prevent surface deposits and in conjunction with mixing efficiency, thermal effects, and pressure requirements at the vessel discharge. The speed must be sufficient to move material from the vessel interior surfaces and screw element surfaces under the influence of drag flow and at the same time force material out of the discharge at the desired flow rate. A preferred speed is in the order of 20 rpm.

In many cases, gravity forces are sufficient to promote the flow of material towards the discharge of the vessel thus permitting the use of infinite pitch screw elements in at least ;art of the vessel where reduced surface area can be tolerated.

In the embodiment shown, a top plate 27 encloses the vessel 10, and has a heating jacket 28 for a liquid heating medium. The liquid material enters the vessel 10 through inlet pipe 29. The vapor by-products released in the vessel pass out at a vent 30 in the top plate 27. This vent 30 is shown in line with and the same size as the hollow center 18 at the top and between the screw elements 14. The final product discharges at the end of the pressure generating section at the bottom of the vessel 10 through a discharge pipe 31.

In another embodiment, the vent 30 is fitted with a sleeve 34 extending to within close proximity of the screw elements. The sleeve is removable, and may be replaced when vent deposits build up to an undesirable level.

The top plate is not an essential feature of the vessel. There may be another vessel extending above the first vessel. Furthermore, the screw elements may terminate before they reach the top of the vessel. They may, for instance, terminate at the liquid level 19.

In the embodiment shown, the screw elements 14 terminate in flat ends 32 designed to wipe the inner surface 33 of the top plate 27. Thus deposits cannot form on the inner surface 33 or the flat ends 32. Clearances in the mixing section between the two screw elements 14, the interior surface 11 and the top surface 33 should be sufficient to prevent deposits forming on any of the surfaces but in the case of a finisher allow a thin film of polymer to form thus facilitating the diffusion of the volatile by-products. Clearances in the order of 1/32 to 1/4 inch are satisfactory for a finisher. In the pressure generating section tight clearances for adequate pressurization are required. Clearances in the order of 0.005 to 1/16 inch are satisfactory for a finisher, but may be more or less for other types of mixers as required.

In operation, materials to be mixed are fed into the vessel 10 through the inlet pipe 29. The flow of the ingredients is controlled so that the level 19 of the pool remains constant. The ingredients are picked up by the screw elements 14 and deposited on the interior surface 11 of the vessel. The ingredients are then forced down into the pool by the wiping action of the screw elements 14 and gravity leaving a thin film of liquid on the interior surface 11 of the vessel 10 and the screw elements. This thin film is constantly being replenished, and exposed to the vessel atmosphere, so that volatile by-products are diffused thus aiding in the mixing and processing of the ingredients.

The material in the pool is forced down the interior surface 11 by the rotating motion of the screw elements 14. Excess material, which does not enter the pressure generating zone, passes up through the hollow center 18 between the screw elements 14, and recirculates again down the exterior surface. Vapors given up during the recirculation pass up through the hollow center 18 and vent through the central vent 30.

The material entering the pressure generating zone is pressurized and pumped out through the discharge pipe 31 at the bottom of the vessel 10.

For ingredients having large quantities of moisture or gases entrained therein, a shaped piece may extend into the hollow center 18 between the screw elements 14. This shaped piece would be wiped by the inside land edges 23A and 23B of the rotating screw elements 14 and could be in the form of a baffle.

The location of the shaft seals 16, at the high pressure end of the pressure generating zone, overcomes the problem of air leakage which is common in conventional equipment when operating under reduced pressure conditions.

In certain conditions, some sections of the apparatus may tend to lose or alternatively generate an undesirable amount of heat. It has been found that by circulating a heat-exchange medium through jacketed or finned walls of the vessel or hollow screw elements, the product in the vessel may be maintained at the desired temperature.

Modifications of the illustrated embodiment may be carried out by those skilled in the art. For instance, the feed may be at the bottom with an overflow or auxiliary scavenging screw at the top for process discharge. In the case of a finisher used in batch operations, the pressure generating zone may be relieved by the addition of slots along the screw or wall or vessel to reduce the pressure generating capacity. Alternatively, blades having infinite pitch may be used. Kneading type sections, reverses, etc. may be used to achieve special blending or other characteristics. The mixing zone of the vessel is particularly suitable for introducing special additives such as copolymers or disperse materials thereby eliminating a further processing step such as passage through a separate mixer. Cones having different diameters may be used with suitable modification of the screw element cross sections.

The lower section of the vessel generally has a conical configuration, and the upper section while shown as a continuing conical configuration in this embodiment may be cylindrical or have a second conical configuration which intermeshes back with the lower conical configuration.

In the latter configuration the screws or blades may be driven from above. Shear rates which greatly affect mixing performance are determined by the clearances between the screws, and between the screws and the walls of the vessel. Another factor involved is the relative surface speeds between the moving surfaces. Specific mixing or dispersing effects are obtained by varying the rotational speed of the screws or by raising or lowering the screw elements to adjust the clearances between the screws and the walls of the vessel. In practice, it is found that making a device with screws having variable clearances is expensive and only necessary in exceptional cases.

The screw elements shown in the present embodiment have equal dimensions, however, they may vary in size and fit in frusto-conical sections having different diameters. The cross section of the screw elements in the mixing zone is shown bounded by three equal arcs with one of the arcs adjacent to the interior surface of the vessel. This configuration may be reoriented so one of the land edges between the arcs is adjacent to the interior surface of the vessel, thus having an edge wiping the interior surface rather than an arc. Furthermore, the geometry of the screw elements may be altered so the cross sections of the elements have a circular configuration.

Process materials from the output of the pressure generating zone may be recycled to the input in batch processes or partially recycled in continuous processes. In the case of a finisher used in the preparation of polyamides, the recycle step facilitates the removal of volatile by-products and increases the viscosity of the polymer by further exposure in the finisher. Recycling may be a separate system from the regular input and output shown in the present embodiment.

I claim:

1. An apparatus for finishing high viscosity synthetic polymers comprising:
   an enclosed vessel having an interior surface throughout its length in the shape of two intersecting conical frustums with axes parallel and substantially vertical, the base of the frustums being displaced upwards with respect to the apexes, an entrance and a vent in the upper portion of the vessel and a discharge in the lower portion of the vessel;
   two interengaging helical screw elements rotatably supported on shafts passing through seals in the base of the vessel, the screw elements when co-rotated conform to the interior surface of the vessel such that the screw elements effect a complete cleaning of the interior surface and wherein the screw elements interengage uninterruptedly along their length such that each element effects a complete cleaning of the adjacent element, the bottom portion of the screw elements forming a pressure generating zone, and the top portion of the screw elements forming a mixing zone having a hollow center described by the co-rotating screw elements.

2. The apparatus according to claim 1 in which the vent in the upper portion of the vessel is coincident with the hollow center between the co-rotating screw elements.

3. The apparatus according to claim 1 in which the vent in the upper portion of the vessel is in the form of a removable sleeve.

4. The apparatus according to claim 1 in which the vent in the upper portion of the vessel is coincident with the hollow center between the co-rotating screw elements and is in the form of a removable sleeve.

5. A mixing apparatus comprising a vessel having an interior surface throughout its length in the shape of at least two intersecting conical frustums with axes parallel and substantially vertical, the base of the frustums being displaced upwards with respect of the apexes, at least two inter-engaging helical screw elements rotatably mounted within the vessel which when co-rotated conform to the interior surface of the vessel such that the screw elements effect a complete cleaning of the interior surface and wherein the screw elements inter-engage uninterruptedly along their length such that each element effect a complete cleaning of the adjacent element, and wherein the screw elements when co-rotated describe a hollow center in the mixing zone of the vessel.

6. A mixing apparatus comprising a vessel having an interior surface throughout its length in the shape of at least two intersecting conical frustums with axes parallel and substantially vertical, the base of the frustums being displaced upwards with respect of the apexes, at least two inter-engaging helical screw elements rotatably mounted within the vessel which when co-rotated conform to the interior surface of the vessel such that the screw elements effect a complete cleaning of the interior surface and wherein the screw elements inter-engage uninterruptedly along their length such that each element effects a complete cleaning of the adjacent element, and wherein the vessel has a top plate having a flat inner surface and the screw elements have a substantially flat upper surface which when co-rotated conform to the top inner surface of the vessel such that the flat upper surface of the screw elements effect a complete cleaning of the top inner surface of the vessel.

* * * * *